(12) United States Patent
Gupta et al.

(10) Patent No.: US 9,817,634 B2
(45) Date of Patent: Nov. 14, 2017

(54) DISTINGUISHING SPEECH FROM MULTIPLE USERS IN A COMPUTER INTERACTION

(71) Applicant: Intel Corporation, Santa Clara, CA (US)

(72) Inventors: Ram Mohan Gupta, Bangalore (IN); Hector A. Cordourier Maruri, Guadalajara (MX); Willem M. Beltman, West Linn, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/336,711

(22) Filed: Jul. 21, 2014

(65) Prior Publication Data
US 2016/0019026 A1 Jan. 21, 2016

(51) Int. Cl.
| | |
|---|---|
| *G10L 15/00* | (2013.01) |
| *G06F 17/27* | (2006.01) |
| *G06F 3/16* | (2006.01) |
| *G10L 21/0272* | (2013.01) |
| *G10L 15/22* | (2006.01) |
| *G10L 21/0216* | (2013.01) |
| *H04R 1/40* | (2006.01) |

(52) U.S. Cl.
CPC .......... *G06F 3/167* (2013.01); *G10L 21/0272* (2013.01); *G10L 15/00* (2013.01); *G10L 2015/223* (2013.01); *G10L 2021/02166* (2013.01); *H04R 1/406* (2013.01); *H04R 2430/25* (2013.01)

(58) Field of Classification Search
None
See application file for complete search history.

(56) References Cited

U.S. PATENT DOCUMENTS

| | | | | |
|---|---|---|---|---|
| 6,707,489 B1 * | 3/2004 | Maeng | ............... | G01S 3/7864 348/14.08 |
| 6,731,334 B1 * | 5/2004 | Maeng | ............... | G01S 3/7864 348/14.08 |
| 7,099,821 B2 * | 8/2006 | Visser | ............... | G10L 21/0208 379/406.08 |
| 7,464,029 B2 * | 12/2008 | Visser | ............... | G10L 21/0272 704/210 |
| 9,100,734 B2 * | 8/2015 | Visser | ............... | G10L 21/0272 |

(Continued)

OTHER PUBLICATIONS

Dinh-Tuan Pham, et al; "Blind Separation of Speech Mixtures Based on Nonstationerity"; Laboretoire des Images et des Signaux, BP 46, 38402 St. Martin d'Here Cedex, Frances; 4 pp.

(Continued)

*Primary Examiner* — Marcus T Riley
(74) *Attorney, Agent, or Firm* — Blakely, Sokoloff, Taylor & Zafman LLP

(57) ABSTRACT

Speech from multiple users is distinguished. In one example, an apparatus has a sensor to determine a position of a speaker, a microphone array to receive audio from the speaker and from other simultaneous audio sources, and a processor to select a pre-determined filter based on the determined position and to apply the selected filter to the received audio to separate the audio from the speaker from the audio from the other simultaneous audio sources.

20 Claims, 10 Drawing Sheets

(56) References Cited

U.S. PATENT DOCUMENTS

2009/0299742 A1* 12/2009 Toman ................ G10L 21/0208
   704/233

OTHER PUBLICATIONS

Dinh-Tuan Pham; "Joint Approximate Diagonalization of Positive Definite Hermitian Matrices"; . . . Laboratory LMC/Imag, C.N.R.S., University of Grenoble, B.P. 53X, 38041 Grenoble cedex, France; 20 pp.

* cited by examiner

DISTINGUISHING SPEECH FROM MULTIPLE USERS IN A COMPUTER INTERACTION

FIELD

The present disclosure relates to speech processing for computer interfaces and, in particular, to distinguishing speech from different computer users.

BACKGROUND

Speech recognition systems are used by automated telephone answering systems, by automobiles for navigation and telephone controls, by computers for commands and dictation, by gaming machines for game play, by televisions for channel selection, and by portable telephones for hands free command and query systems. In these and many other systems, the user speaks into a microphone and the system analyzes the received audio to determine whether it corresponds to a command or query. The speech recognition may be done on a small local processor or the signals may be sent to a larger server or other centralized system for processing.

Speech recognition systems rely on the microphones and receiving systems for accurately receiving the voice and then for filtering out other noises, such as wind, machinery, other speakers, and other types of noises. For a telephone or a computer gaming system, there may be very little other noise. For a portable telephone or a computer, there may be more ambient noise and other speakers may also be audible. A variety of different noise cancellation systems have been developed to isolate the user's voice from the noise. For portable telephones, two microphones are often used. The main microphone is directed to the speaker and a noise cancellation microphone is pointed in a different direction. The noise cancellation microphone provides the background noise which is then subtracted from the audio received in the main microphone.

Blind Source Separation (BSS) has been developed to separate the voices of two speakers that speak at the same time. BSS typically uses more complex audio processing than a simple noise cancellation microphone. BSS refers to techniques that extract voices or other audio or other types of signals that are from different sources from a mixture of these signals without using any specific knowledge of the signals, the signal sources, or the positions of the signal sources. BSS requires only that the different sources be statistically independent which is the case when the sources are voices from different people. One voice may be filtered out or the two voices may be separated so that both are provided to a speech recognition system. When multiple speakers interact with a system simultaneously, multiple microphones capture the combined speech. BSS is intended to separate the speaker's voices into separate channels, by generating "de-mixing" filters such as finite-impulse-response (FIR) filters. When the filters depend on the voice source locations, BSS requires re-training (i.e. re-calculating the filters) whenever any of the speakers change location.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

A Blind Source Separation (BSS) technique may be used to provide a speech interface to any of a variety of different devices including computers, gaming machines, televisions, and telephones both fixed and mobile, among others. BSS may be used to separate the simultaneous voice based interaction of two or more users, by first separating the speech from different users and then transcribing the speech through some automatic recognition engine. The speech may be recorded, transmitted, used as a command, or applied to a variety of other purposes.

BSS refers to many different techniques that distinguish audio from different sources without any knowledge of the audio source. BSS generally relies on an assumption that the characteristics of the audio from the different sources are statistically independent or statistically uncorrelated. These techniques are able to distinguish different sources, however, some processing is required to recognize, analyze, and distinguish the audio sources. Since audio tends to reflect from surfaces and then interfere with other reflections and the original source, in any particular environment the audio received from any particular source may change if the source moves. In, for example, the case of speakers that are moving around a room, the statistical characteristics of the audio received from each speaker changes so quickly, that it is difficult to separate different moving sources without a significant delay.

BSS normally requires re-training each time a signal source moves. This re-training causes some delay between when the speech is received and when it can be extracted. The delay may obscure the first part of the speech or cause a delay until after the system is re-trained. For a speaker that moves frequently, the delay may render the system impractical. For higher quality separation, more complex filters are used which require even more accurate and frequent re-training. The complex and frequent re-training also requires significant processing resources.

To eliminate the delay and computational load, a BSS system may be initially trained with a single generalized voice for multiple locations within a space. During this initial training, the delay between multiple microphones may be forced to zero and a set of de-mixing filters may be generated for each position. Then, different positions in space may be emulated by varying the transfer functions of the de-mixing filters corresponding to each different position. The different sets of transfer functions are stored. An appropriate filter transfer function is then selected for use in the BSS based on the position of the desired speaker. Using the stored transfer functions, BSS and similar techniques may be used without additional training. Users are able to move around while interacting with the system. This allows for simultaneous multiple user speech recognition.

Figure 1:
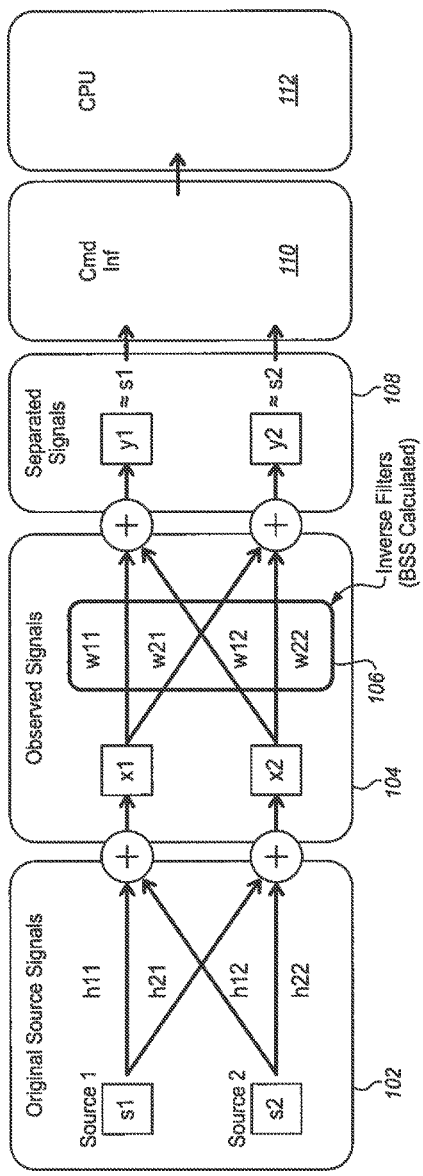
FIG. 1 is a diagram of audio signals in an audio environment and apparatus for separating simultaneous audio signals according to an embodiment of the invention.

FIG. 1 is a diagram of separating signals from two different speakers using a blind signal separation or a similar technique. In any location 102, sound h11, h22 from many different sources s1, s2 is mixed by the environment. The mixed signals captured by a system's 104 array of microphones x1, x2 include sound from more than one source. The sound includes sound received directly from a source h11, h22 and sound received indirectly from a source h21, h12. The indirect sound may come from indirect propagation h21, h12, from reflections, from echoes and from resonance in the environment 102.

Using the input from this array x1, x2, the system 104 generates de-mixing filters 106 that are applied to the mixed signals. The filters are typically but not necessarily FIR (Finite Impulse Response) filters w11, w12, w21, w22 which generate final output signals y1, y2. The system output interface 108 supplies these de-mixed signals y1≈s1 and y2≈s2 to other processes. In FIG. 1, these other processes are a command interface 110 which interprets the sound as a spoken command and provides the command to a CPU 112 for execution, however, the invention is not so limited.

The term "de-mixing" filter refers generally to any of a variety of different types of filters that may be used to separate one source form other sources and from ambient noise. For BSS, the de-mixing filters are typically finite impulse response (FIR) filters, however, the invention is not so limited. A fast Fourier transform (FFT) is performed on the received audio. The resulting frequency domain signal is then applied to the FIR filter, for example by convoluting the signal with the filter. An inverse FFT is applied to the filter signal and the separated audio is accordingly recovered in the time domain for further processing. Such a process may be combined with other processing to obtain even better results or to improve the audio quality. The specific nature of the FIR for each situation and condition is typically determined empirically for each audio environment through training, however, the invention is not so limited.

The de-mixing filters are generated using a training, tuning, or calibration process. The filters depend on the position of the microphones x1, x2, the environment 102, and the position of the sound sources s1, s2. When the sources change positions, the mixing environment changes, and new filters w11, w21, w12, w22 are used. If the sound source is a human user, then the user is very likely to change position frequently and the system 104 retrains frequently.

Figure 2A:
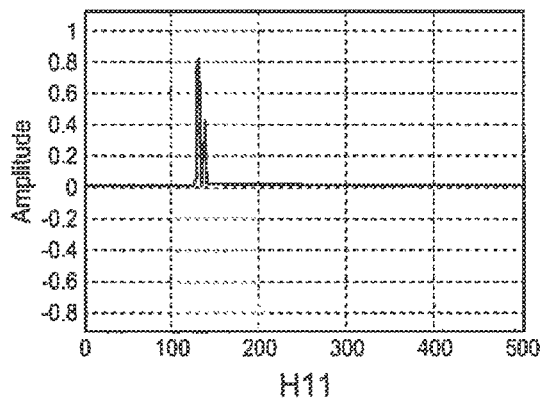
FIGS. 2A to 2H are simplified graphs of finite impulse response filter values for different audio signals that may be used in the apparatus of FIG. 1 according to an embodiment of the invention.
Figure 2B:
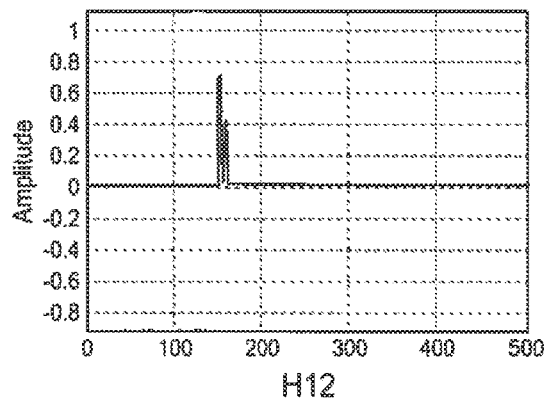
Figure 2C:
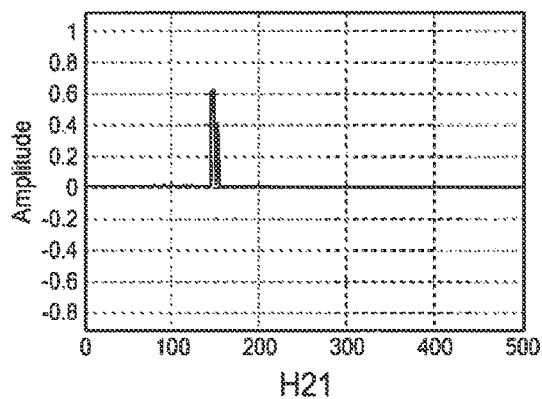
Figure 2D:
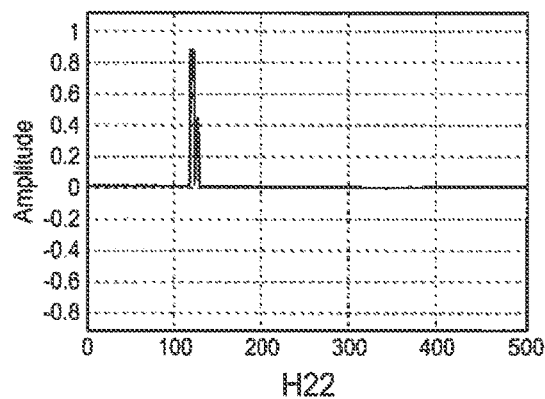

FIGS. 2A to 2F show simplified graphs of FIR values for different signals identified in FIG. 1. The vertical axis shows amplitude against a horizontal time axis. FIG. 1A shows an amplitude impulse h11 generated by the first source s1 as received at the first microphone x1. The impulse is positioned at about 125 on the time scale with an amplitude of 0.8. FIG. 2B shows the same impulse h12 generated by the same source s1 as it is received at the second microphone x2. The amplitude pulse has the same shape but is delayed to a time of about 150 and attenuated to about 0.7. Similarly FIG. 2D shows the amplitude impulse h22 generated by the second source s2 as received at the second microphone x2. FIG. 2C shows this signal h21 from the second source s2 as received at the first microphone x1 with a delay and an attenuation.

Figure 2E:
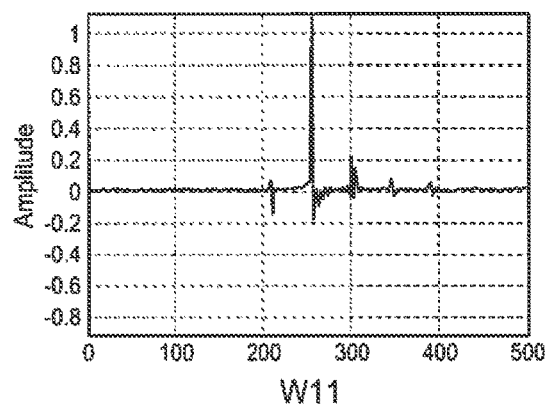
Figure 2F:
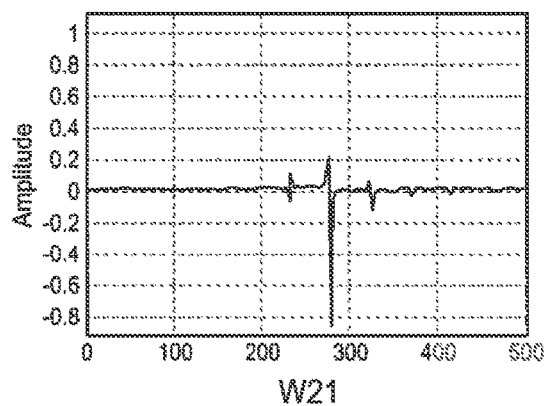
Figure 2G:
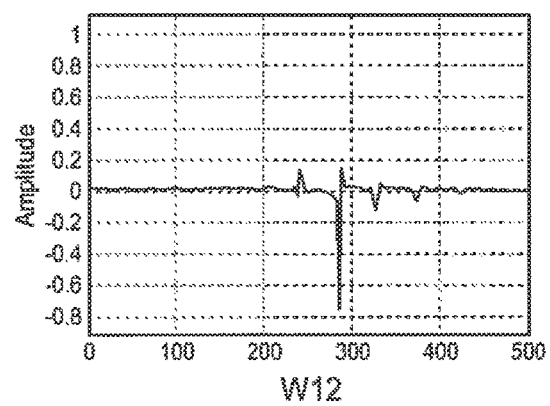
Figure 2H:
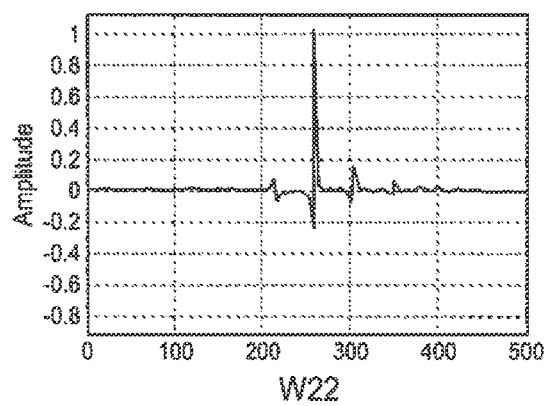

The signals are mixed by the ambient of the environment and received in this mixed condition at the receiving microphones x1, x2. They may also be mixed with echoes, noise, resonances, and other signal sources not shown here in order to simplify the diagram. FIG. 2E is an example of a FIR filter w11 that would be applied to the signal received by the first microphone based on the original source signal h11. FIG. 2G is an example of a filter signal w12 that would be applied to the second source signal as received by the first microphone h12. By applying these signals to the first microphone signal, the signal from the first source is enhanced and the signal from the second source is attenuated. Similarly, FIG. 2F is an example of a filter signal w21 that would be applied to the first source signal as received by the second microphone h21 and FIG. 2H is an example of a signal that would be applied to the second source signal as received by the second microphone h22. Similar filter signals may be generated for echoes, noise, resonances and other signal sources. These may be combined with the illustrated filter signals.

Since the signals at the microphones are mixed, the filter signals are applied to the mixed signals and not to single isolated signals. The first microphone signal may be processed using two filter signals w11, w12 or all four filter signals. The result is the enhancement of one received sound signal and the suppression of all others.

In establishing the filters, the specific parameters and the nature of the filters are selected so that the speech recognition of the command interface is successfully able to recognize the spoken commands. The required amount of separation determines the complexity of the training, the accuracy of the filters and the required precision for each speaker's location. The position of a speaker may be identified as being within a certain range of positions. When the speaker is within a specific range of a particular central position, then the same filter may be used. When the speaker moves too far from the central position, then a different filter is used in order to maintain sufficient separation.

The range of positions around a particular central position that use the same filter parameters is referred to herein as a separation bubble. The separation bubbles determine the range of movement allowed for each set of filter parameters. Typically adjacent bubbles will overlap so that, at the edge of two bubbles, similar results are obtained using either the filters for one of the bubbles or the filters for the other one of the bubbles. The maximum size of the separation bubble is determined at least in part by the required amount of separation. The bubbles may also change in size if there is a change in the amount of diffusive background noise and for different rooms.

Figure 3A:
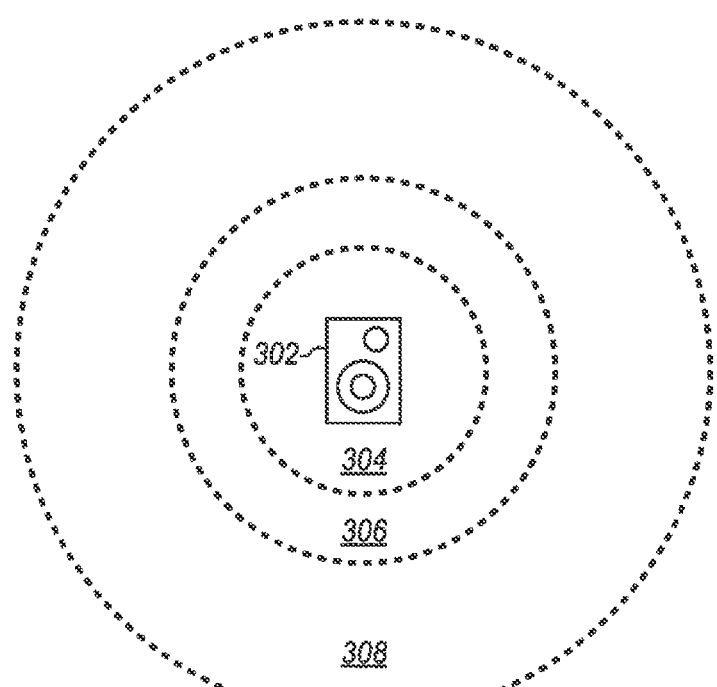
FIGS. 3A and 3B are front and side view respectively of an isolation volume for separating simultaneous audio signals according to an embodiment of the invention.

A BSS filter set established, for example by training with an audio source, such as a speaker, at a certain position reduces its separation performance as the speaker moves away from the original trained position. FIG. 3A is a diagram of a front view of a separation volume or separation bubble 304 surrounding a source 302 in which BSS performance is acceptable. As mentioned above, the amount of separation that is to be considered acceptable depends upon the particular use of the audio signals. Less separation may be required to distinguish between a limited set of commands than would be required to transcribe spoken words into text. In the example of FIG. 3A, a dynamic loudspeaker with voice coil drivers is shown as an example of the speaker. However, any other type of speaker that is able to provide repeatable results may be used. In some cases, speaker is used herein to refer to an electrical device and in other cases it is used to refer to person that is speaking.

Figure 3B:
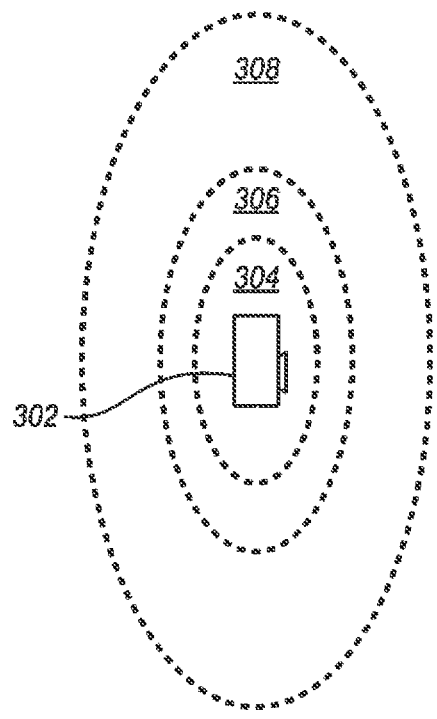

In some voice recognition tests, if the BSS routine can separate out the desired audio signal by a separation factor of 70% this may be enough to achieve acceptable voice recognition. 70% corresponds to the area shown as the inner bubble 304. A signal produced anywhere in in the inner bubble will provide for at least 70% separation for the desired speaker using filters that are based on a signal at the center of the inner bubble. The inner bubble has a volume of the shape of an ellipsoid. FIG. 3A shows a circular cross-section as viewed from the front from the perspective of the microphones. FIG. 3B shows the same inner bubble 304 from the side and shows that the bubble is taller than it is deep, forming an ellipse from this view. The bubble has the shape of an ellipsoid, with the lower radius in the vertical direction as shown on the page.

For less demanding applications, a larger bubble may be used. FIGS. 3A and 3B show a larger central bubble which provides a separation of at least 50% using the same filter trained on the center of the bubbles. Similarly for even less demanding applications, some lesser amount of separation may be required. An outer bubble 308 is also elliptical as viewed from the side and represents separations that range from 50% at the inner edge to 0% at the outer edge. In other words when the source is positioned at the outer edge of the outer circle and the signals are filtered based on the source being at the center of the bubble, then the system is unable to separate the signals at all. Depending on the application for the audio signals, if the source moves too far from the center, then a new set of filters is required. The new set of filters will correspond to a new bubble next to, and perhaps partially overlapping with, the bubble shown in FIG. 3A. As an example, the 50% bubble of the neighboring bubble may abut, adjoin, or nearly abut, the 50% bubble 306 of the illustrated bubble. For better separation of the signals, the 70% bubbles may abut each other so that the 50% bubbles completely overlap on one side.

The shape and size of the separation bubble in any particular implementation depends on the microphone positions. The size of the bubble might vary for different microphone positions. Because the bubbles and corresponding filters require some time to generate and vary for different systems and environments, multiple separation bubbles may be generated in advance and stored, for example, in a lookup table. The operation of a BSS system may then be emulated without requiring the delay and processing power that BSS consumes.

Figure 4:
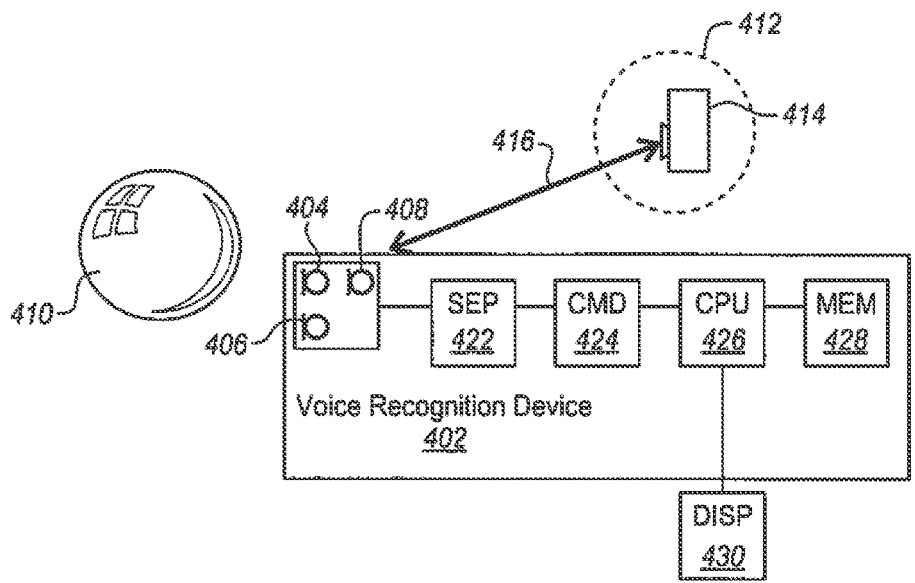
FIG. 4 is a diagram of training an apparatus to generate finite impulse response filters according to an embodiment of the invention.

A training process is shown in the example of FIG. 4. A computing device 402 is placed near different possible positions for speakers. The voice recognition device may be a computer, an information display terminal, a gaming or entertainment device, a remote communications station or any other device that is to distinguish between different simultaneous speakers. The device 402 is equipped with multiple microphones, in this case three 404, 406, 408. The microphones are spaced apart from each other and placed on different faces of the device so that each microphone receives a different audio signal from the ambient environment.

The device is trained to determine filter parameters that correspond to different speaker positions with respect to the device. In the illustrated example, there is a first bubble 410 for which the device is already trained. The device is then training for a second bubble 412. To this end, a speaker 414 is placed in the center of the new bubble 412. The speaker produces audio 416 that is received by the microphones 404, 406, 408. The acoustic qualities of the environment act on the audio as it propagates to the device. If the audio signal is known, then the received signal can be compared to the known signal to generate filter parameters for the particular location. This may be repeated for as many locations as desired.

The device 402 includes many additional components so that the received audio signals may be put to practical use. These components may include a separation module 422 coupled to the microphones 404, 406, 408. The separation module may have filters for performing a blind source separation, buffers for holding audio signals for analysis, and memory for storing filter parameters and other components. The separation module may perform other operations to separate the audio signal sources in addition to or instead of blind source separation. The separation module may be coupled to a command interface 424 to interpret the separated audio as a command or some other signal. A CPU 426 is coupled to the command interface to receive the commands and other signals and run appropriate operations or functions in response to the commands. The CPU is coupled to a memory 428 to store programming instructions, temporary values, parameters and results, and to a display 430 to interact with the user. The display may include a touchscreen to receive user input or there may be other user input devices, such as buttons, keys, or cameras. The device may have additional components (not shown) to facilitate additional functions, depending on the particular implementation.

Figure 5:
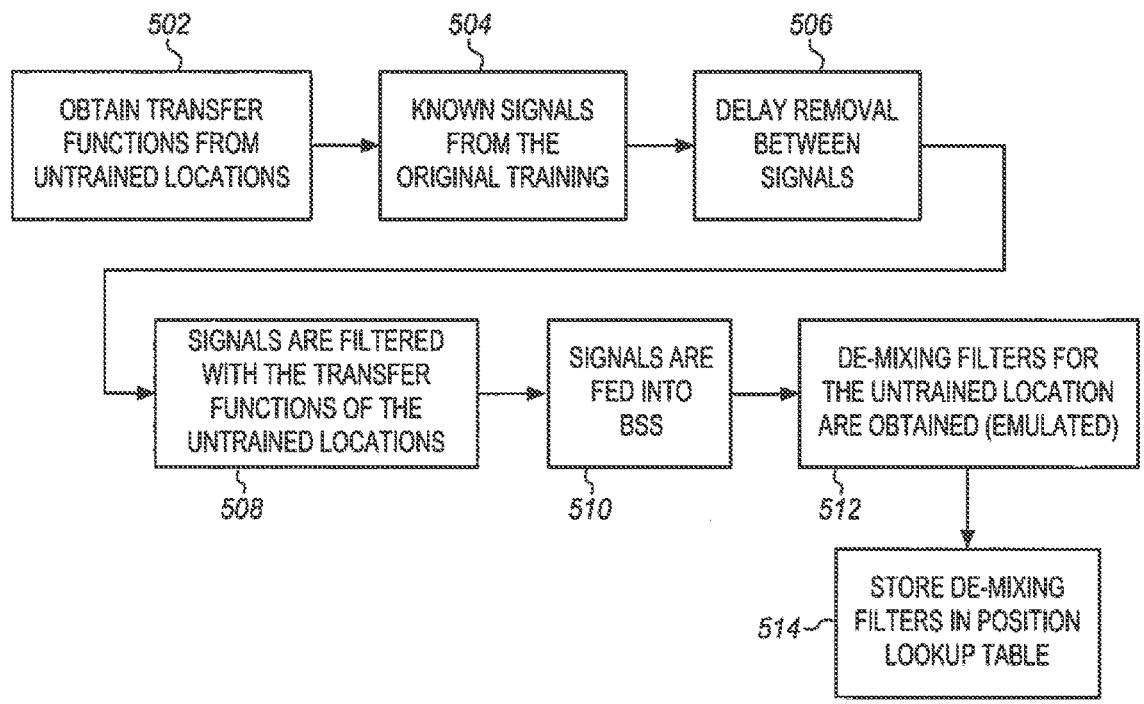
FIG. 5 is a process flow diagram of training an apparatus such as that of FIG. 4 according to an embodiment of the invention.

FIG. 5 shows a process flow for obtaining filters for the new locations using the system configuration shown in FIG. 4. A system such as the voice recognition device 402 of FIG. 4, first obtains at 502 transfer functions (TF) from different locations in a particular environment or setting, for example a room. The TF's may be in the form of digital filters that emulate the transfer of audio from one spatial point to another. In the present example, the first spatial point is the location of the speaker and the second spatial point is at each microphone. For the case of three microphones, there are three TF's for each bubble. The TF's can be obtained using, for example sweeping chirps, white noise, or any other suitable signal and comparing the received signal to the known signal that was produced by the speaker.

After obtaining the TF's, the TF's can be used to filter any audio signal and emulate the effect of that signal traveling from one location to another Then at 504, the original known signals from the originally trained bubble are taken. These represent a single true recording. At 506, the signals from these true recordings are forced to zero delay by removing the delay between signals recorded from different locations.

To emulate any new point in space, recorded signals are filtered at 508 with the transfer functions of the new locations from 502, which generate new audio signals that act as if they were recorded on the new location. In other words, by filtering a recorded signal with the three TF's for a particular location, three new audio signals are obtained that are very close to a real signal from that location as it would be received by the microphones. The filtered signals are fed into BSS at 510. Then, de-mixing filters are obtained at 512 using BSS.

This approach to obtaining de-mixing filters is equivalent to doing the training for each new position. Many different locations can be trained around the recognizing device. The de-mixing filters are stored at 514 in a position lookup table. From the position table, the filters may be used by the voice recognition device to isolate a speaker at each location. Such a routine generates separation bubbles around the recognition device or microphone array for any position that a user might take.

The emulated training produces separation levels that are not only sufficient but almost as good as the separation levels produced with real training. Separation levels of 25-30 dB may be obtained in both cases, with little difference in the separation level between emulated and real training. Emulated and real training may be performed with one voice and then used for another very different voice. As an example when training is done with a female voice, the same filters may be used with good results for a low voice.

In regular operation, the location of the user will be detected by acoustical means using cross correlation, for example or by optical means using cameras. The system will search in the lookup table for the de-mixing filters that fit with the detected location for that user. These de-mixing filters are then used to separate the user's speech. The system can separate simultaneous speech from multiple users in different bubbles as long as their locations can be determined. The users' movements can be tracked using the location detection. The system can then change the filter selection as each user moves to a different bubble. With a sufficiently precise location determination, the best separation bubble can be determined to perform successful voice separation.

Figure 6:
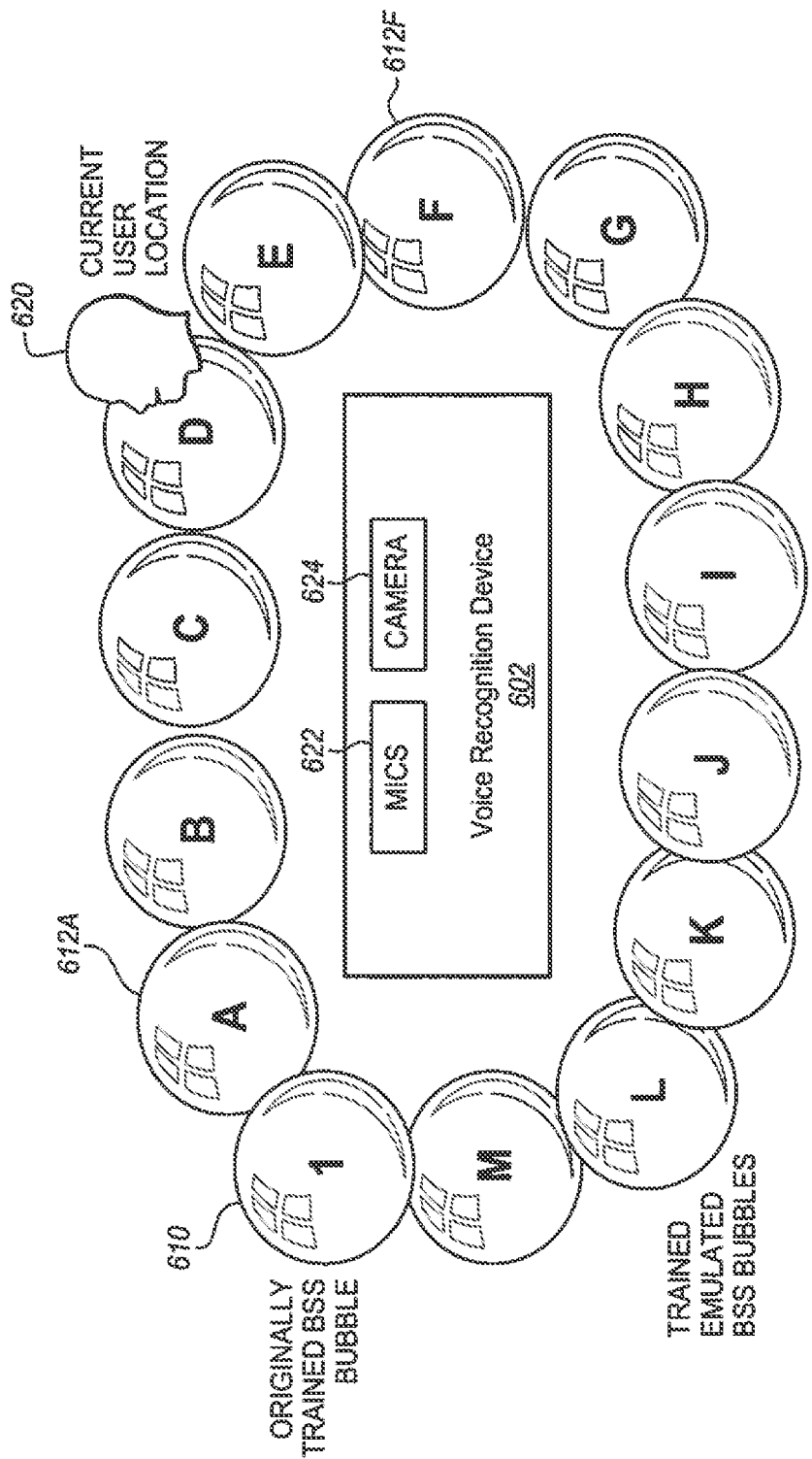
FIG. 6 is a diagram of a voice recognition device after training according to an embodiment of the invention.

FIG. 6 is a diagram of a voice recognition device 602 for which training has been completed. There is an originally trained BSS bubble 610 and a surrounding ring of added bubbles 612A to 612-M. Each of these bubbles may be trained individually or the emulated training of FIG. 5 may be used to add additional bubbles in new locations. In this example a speaker 620 in a current location speaks directly to a voice recognition device 602. The speaker's position may be determined either using the microphones 622 or one or more cameras 624. A variety of different location techniques may be used from delay measurement and triangulation to various depth of field techniques through stereo vision or stereo audio. The position of the speaker is determined and then applied to a filter selector. The filter for that location is selected and the speaker's voice may be distinguished from the voice of another speaker.

Figure 7:
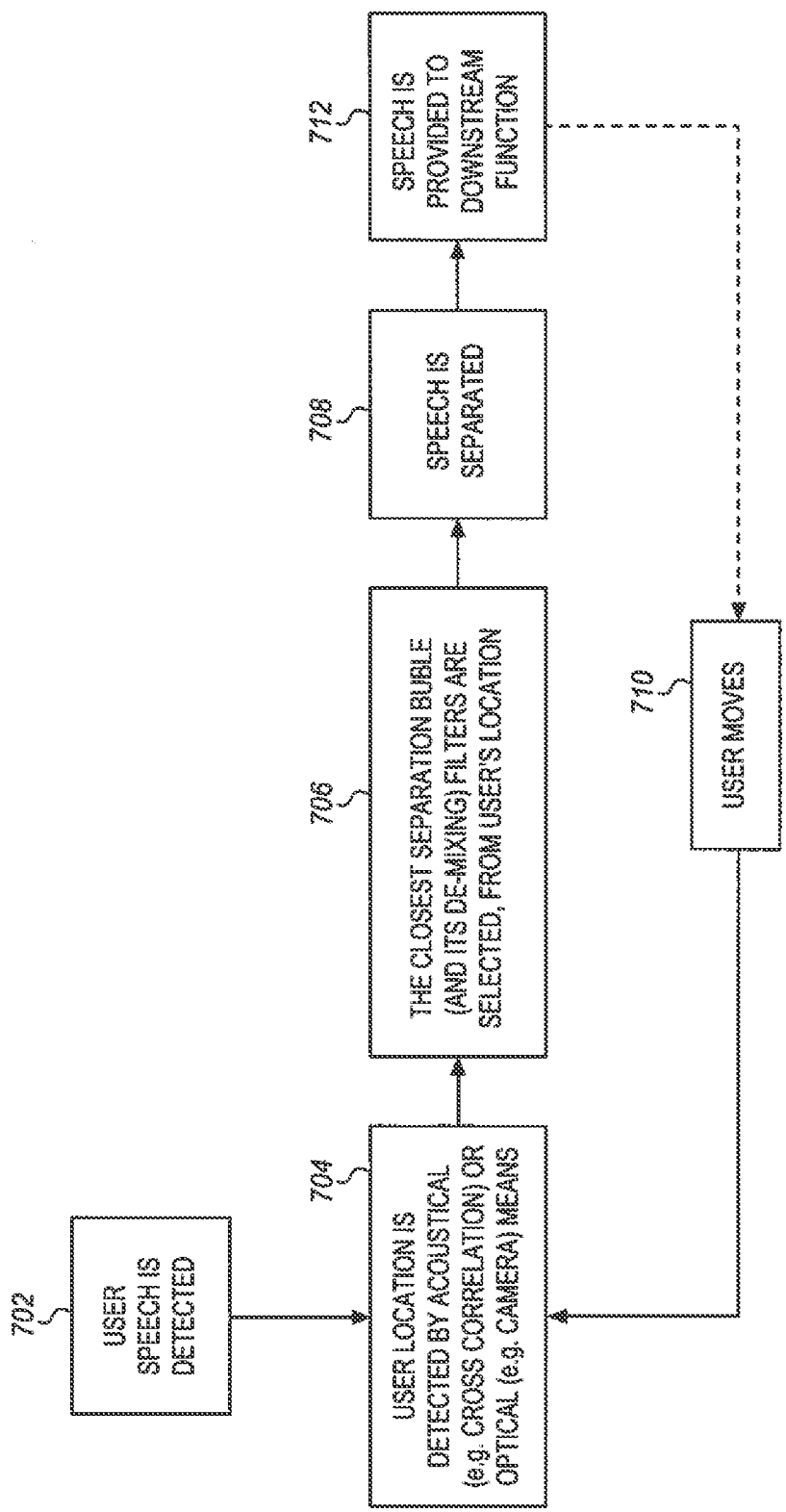
FIG. 7 is a process flow diagram of selecting a filter for a device such as that of FIG. 6 according to an embodiment of the invention.

The selection of a filter is shown in more detail in the process flow diagram of FIG. 7. In FIG. 7 at 702 user speech is detected. At 704 the user's location is detected using acoustical or optical technology. At 706 the closest separation bubble, for example, one of the bubbles 612-A to 612-M of FIG. 6 is selected based on the location. The appropriate de-mixing filter is then selected using that location. At 708 the user's speech is applied to the selected de-mixing filter to separate the speech from other sounds and at 712 the speech is provided to a downstream device or function. As the user 620 continues working in the vicinity of the voice recognition device 602, the speaker may move to a different position. This may be tracked and detected using the microphones or cameras when the user moves at 710. The location is then detected and at 704 the closest separation bubble is chosen. The appropriate filters for the bubble are applied and the speech is then separated.

Figure 8:
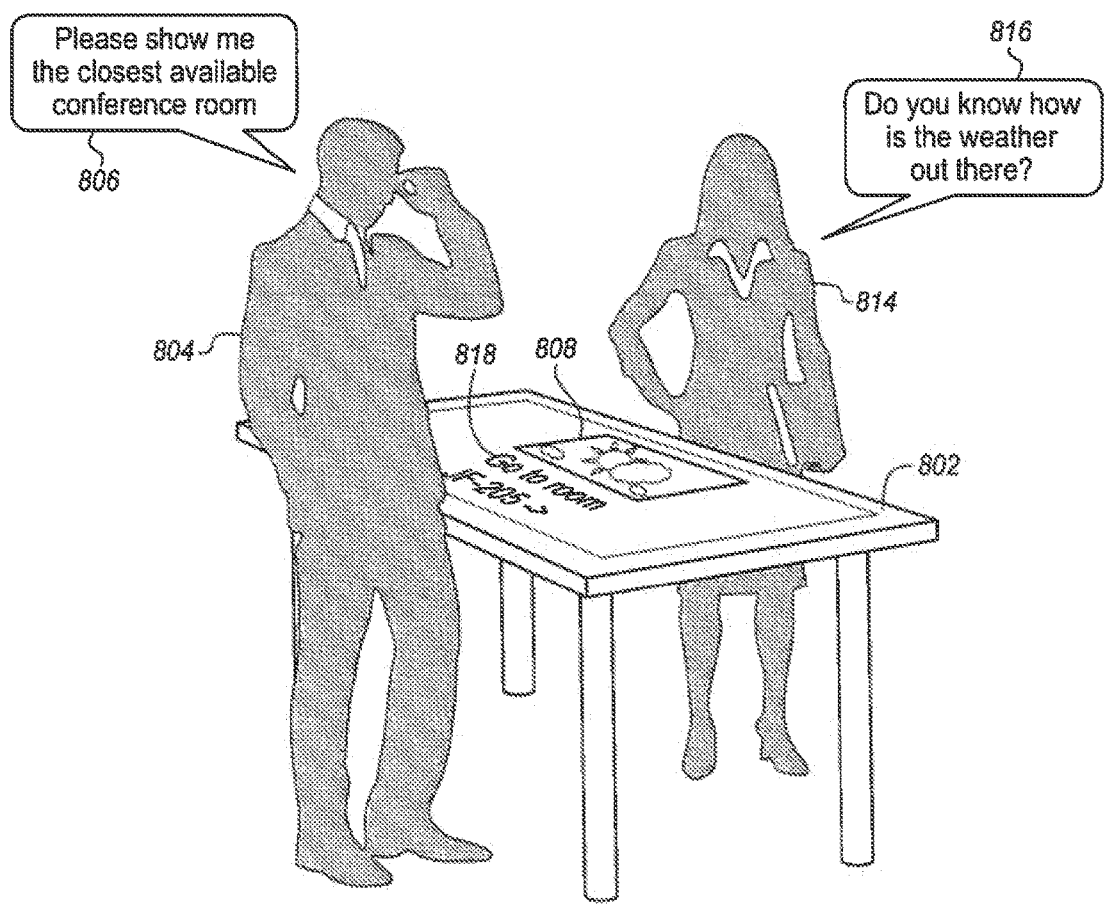
FIG. 8 is a diagram of using a fixed voice recognition device according to an embodiment of the invention.

FIG. 8 is an example of how such a voice recognition device may be used in a practical application. In FIG. 8 a voice recognition device is integrated into a large panel computing system 802. The display table 802 includes multiple microphones and may also include cameras, computers, and communication resources. The voice recognition device and voice separation system is incorporated into the computing resources of the display table. A first user 804 generates speech 806 at one location. In the illustrated example the speech is "show me the closest available conference room." As shown on the display table, the table responds with displayed text 818 which is "go to room JF-205" and a displayed arrow indicating the direction of the room. As shown, since the system has determined the location of the speaker, the response may be oriented toward the speaker for easier viewing.

Simultaneously a second user 814 is also generating speech. In this case the speech is "Do you know how is the weather out there?" This speech 816 is also received by the display table 802 and a weather prediction 808 is displayed on the table. The second user is on the opposite side of the display table. Accordingly, the weather prediction is inverted from the conference room text so that it is more easily understood by the second user.

Because these two speakers are in different locations which correspond to different separation bubbles (not shown) the simultaneous speech can be separated and the display table can simultaneously respond to both queries provided by the two users. While voice queries are shown in this example, a wide variety of different commands, instructions and requests may be provided by the users and acted upon by the display table 802. While a table configuration is shown for the computing device, a wide range of other configurations may be used. The computing device may be on a stand, suspended from a wall, placed vertically, horizontally or in any other position. There may be multiple displays and an appropriate one of the displays selected based on the user's detected position. The microphones and cameras may be incorporated into the computing system or placed very close nearby or they may be placed in a different location with a large distance between different microphones or cameras to provide a more accurate estimate of the location.

While the example of FIG. 8 shows an open space with the users and the computing device, typically this space will correspond to a room with walls surrounding the users. The training can be made to take these walls into consideration. Such a system may be used in a wide variety of different open and closed environments, large and small.

Figure 9:
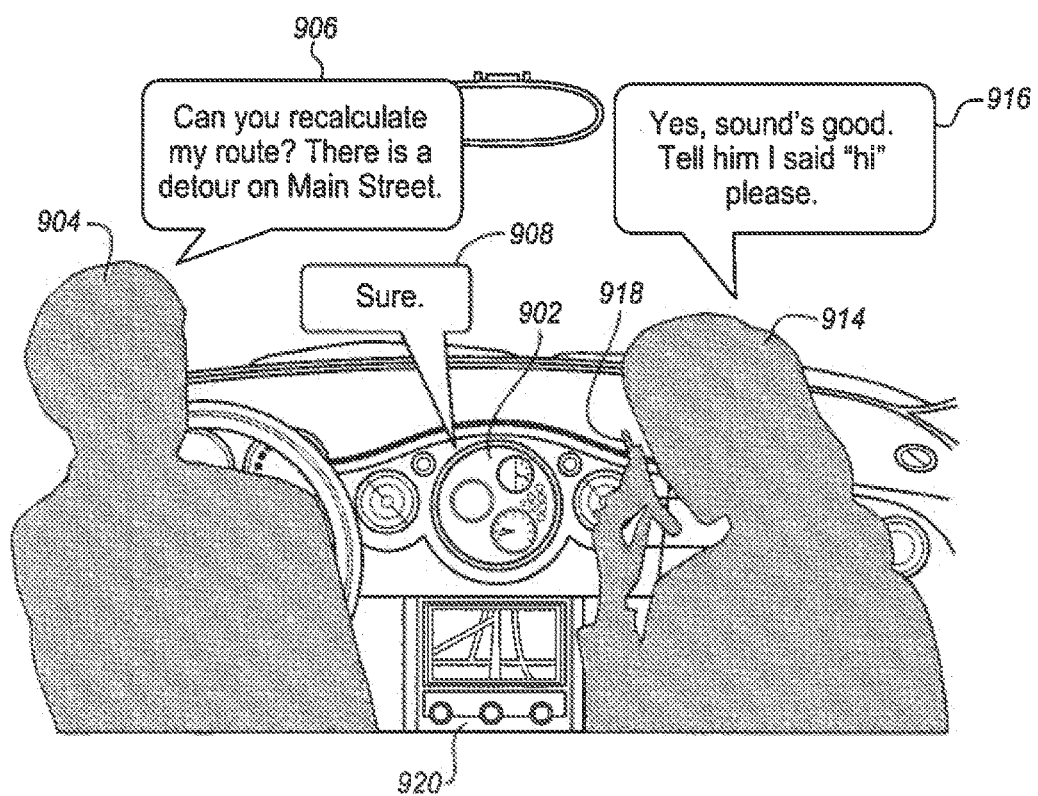
FIG. 9 is a diagram of using a mobile voice recognition device according to an embodiment of the invention.

FIG. 9 shows an alternative situation in which two people are sitting in a car and talking simultaneously. The same approach as in the FIG. 8 may be used in this much smaller closed environment. In this example one of the users is giving commands to a computing system in the car while the other user is not giving commands to the system but instead speaking to someone else using a separate portable telephone.

Specifically, a computing system 902 is mounted to a vehicle. A first user 904, in this case the driver, issues a command in spoken form which in this case is "Can you recalculate my route? There is a detour on Main Street." The command is received by an in-car computer 902. The computer provides an audio response 908 in the form of a spoken word "sure." The computer also provides a visual response 920 in the form of a map of the recalculated route. Simultaneously, a second user in the car 914 is speaking but not to the computing device.

In this example, the second user 914 is speaking a statement "Yes, sounds good. Tell him I said 'hi', please"

into a personal telephone 918 which is not connected with the car computing device. The two users are sitting in different locations which correspond to the two front seats of the car. These two locations can easily be distinguished from each other with separate separation bubbles. The computing system, using these two separation bubbles, can separate and distinguish the driver commands from the passenger's speech. In an actual scenario the computer system will likely separate the driver's speech from the passenger's speech and the passenger's speech from the driver's speech. The driver's speech is recognized as a command to the computing system while the passenger's speech is not recognized as a command to the computing system. Therefore the computing system is able to act on the speech of the driver without that speech being obscured by that of the passenger.

In a car, the positions of the speakers are limited to the positions of the seats and body movements within the positions of those seats. The interior environment of the car does not change and the computing system in the car and the car is not easily moved. Accordingly setting up separation bubbles can be done at one time before the car is provided to a customer. The in-car computing system may be configured to respond to simultaneous commands from both speakers as in FIG. 8.

The response to the command depends upon the particular command and any convenient command may be supported. In the context of FIG. 8, the responses may include providing visual or audio information, retrieving and transmitting data, and any other desired action. Such a table may be used for visitors in a lobby, for in-store interaction or point-of-sale, or as a workstation or computing station for productivity applications, among others. The in-car commands of FIG. 9 may include navigation as shown, commands to vehicle systems, such as heating, entertainment, and vehicle configurations. In addition, the commands may relate to in-car communications systems. A driver or passenger may lower the temperature, send a text message to another person, dial a telephone number, or listen to a song, among other things, depending on the particular implementation.

Figure 10:
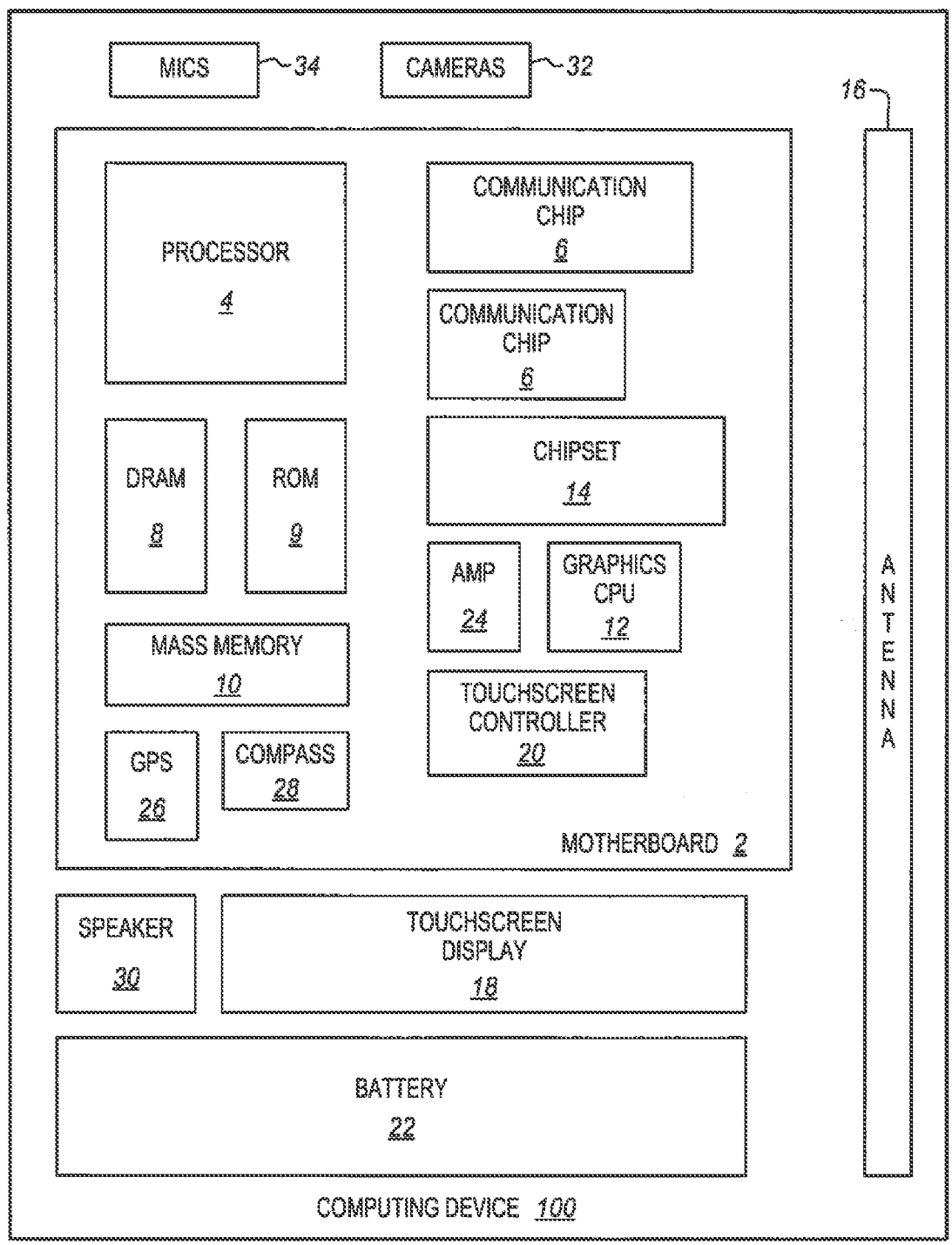
FIG. 10 is a block diagram of a computing device incorporating a voice recognition device according to an embodiment.

FIG. 10 illustrates a computing device 100 in accordance with, one implementation of the invention. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio coder (not shown), a video coder (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Pi and Bluetooth and a second communication package 6 may be dedicated to longer range wireless communications such as GPS, EDGE, GPRS, CDMA, WiMAX, LTE, Ev-DO, and others.

The processor 4 of the computing device 100 includes an integrated circuit die packaged within the processor 4. The term "processor" may refer to any device or portion of a device that processes electronic data from registers and/or memory to transform that electronic data into other electronic data that may be stored in registers and/or memory. The processor may be packaged as a system on a chip (SoC) that includes several other devices that are shown as separate devices in the drawing figure.

In various implementations, the computing device 100 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes determining a position of a speaker, selecting a pre-determined filter based on the determined position, receiving audio from the speaker and from other simultaneous audio sources at a microphone array, and applying the selected filter to the received audio to separate the audio from the speaker from the audio from the other simultaneous audio sources.

In further embodiments the audio from the speaker is a spoken command, the method further includes applying speech recognition to the received command to determine the spoken command. Further embodiment include executing the determined command.

In further embodiments determining a position of the speaker comprises receiving audio from the speaker at a plurality of microphones and comparing delay of the received audio.

In further embodiments determining a position of the speaker comprises observing the speaker with a camera and using the observation to determine the position of the speaker.

In further embodiments selecting a pre-determined filter comprises applying the determined position to a look-up table of different positions to obtain the pre-determined filter.

In further embodiments the other simultaneous audio sources comprise a command spoken by a second speaker, the method further includes determining a position of the second speaker, selecting a pre-determined filter based on the determined position of the second speaker, and applying the selected filter to the received audio to separate the command from the second speaker from the audio from the first speaker.

In further embodiments applying the selected filter comprises performing a blind source separation on the received audio. In further embodiments the selected filter is a finite impulse response filter. In further embodiments applying the selected filter comprises applying the selected filter in the frequency domain.

Some embodiments pertain to an apparatus with a sensor to determine a position of a speaker, a microphone array to receive audio from the speaker and from other simultaneous audio sources, and a processor to select a pre-determined filter based on the determined position and to apply the selected filter to the received audio to separate the audio from the speaker from the audio from the other simultaneous audio sources.

In further embodiments the sensor comprises a camera. In further embodiments the sensor comprises the microphone array and the position of the speaker is determined by comparing delays in the received audio at each of the plurality of microphones.

In further embodiments the audio from the speaker is a spoken command, the processor further applying speech recognition to the received command to determine the spoken command and executing the determined command.

Further embodiments include a memory to store a lookup table of different speaker positions and the processor applies the determined position to the look-up table to obtain the pre-determined filter.

In further embodiments the lookup table is populated by using a plurality of transfer function for each determined position and by applying each of the transfer functions to a known stored audio reference signal.

In further embodiments the determined position is compared to a plurality of overlapping isolation volumes and selecting a pre-determined filter comprises selecting a filter corresponding to one of the plurality of isolation volumes.

Some embodiments pertain to a computing system that includes a plurality of cameras to observe a speaker and determine a position of the speaker, a plurality of microphones to receive audio from the speaker and from other simultaneous audio sources, a processor to select a pre-determined filter based on the determined position, and a signal processor to apply the selected filter to the received audio to separate the audio from the speaker from the audio from the other simultaneous audio sources, the processor to apply speech recognition to the received command to determine the spoken command and to execute the determined command.

Further embodiments include a display coupled to the processor to display information in response to executing the command.

In further embodiments the filter is a finite impulse response filter and the signal processor applies blind source separation to separate the audio.

What is claimed is:

1. A method comprising:
   determining a position of a person that is an audio source as a speaker at a sensor of a computing system;
   selecting a pre-determined audio filter from among a plurality of audio filters stored in a memory of the computing system based on the determined position of the speaker, each of the plurality of audio filters being configured for a possible sneaker position;
   receiving audio from the speaker and from other simultaneous audio sources at a microphone array of the computing system; and
   applying the selected pre-determined audio filter to the received audio at an audio system of the computing system to separate the audio from the speaker from the audio from the other simultaneous audio sources.

2. The method of claim 1, wherein the audio from the speaker is a spoken command, the method further comprising applying speech recognition to the received spoken command to determine the spoken command.

3. The method of claim 1, further comprising executing the determined spoken command by the computing system.

4. The method of claim 1, wherein determining a position of the speaker comprises receiving audio from the speaker at a plurality of microphones and comparing delay of the received audio.

5. The method of claim 1, wherein determining a position of the speaker comprises observing the speaker with a camera of the computing system and using the observation to determine the position of the speaker.

6. The method of claim 1, wherein selecting a pre-determined filter comprises applying the determined position to a look-up table of different positions to obtain the pre-determined filter.

7. The method of claim 1, wherein the other simultaneous audio sources comprise a command spoken by a second speaker, the method further comprising:
 determining a position of the second speaker;
 selecting a pre-determined filter based on the determined position of the second speaker; and
 applying the selected pre-determined filter to the received audio to separate the command from the second speaker from the audio from the speaker.

8. The method of claim 1, wherein applying the selected pre-determined audio filter comprises performing a blind source separation on the received audio.

9. The method of claim 8, wherein the selected filter is a finite impulse response filter.

10. The method of claim 9, wherein applying the selected pre-determined audio filter comprises applying the selected pre-determined audio filter in a frequency domain.

11. An apparatus comprising:
 a sensor to determine a position of a person that is an audio source as a speaker;
 a microphone array to receive audio from the speaker and from other simultaneous audio sources; and
 a processor to select a pre-determined audio filter from a plurality of pre-determined audio filters based on the determined position of the speaker, each of the plurality of pre-determined audio filters being configured for a possible sneaker position and to apply the selected pre-determined audio filter to the received audio to separate the audio from the speaker from the audio from the other simultaneous audio sources.

12. The apparatus of claim 11, wherein the sensor comprises a camera.

13. The apparatus of claim 11, wherein the sensor comprises the microphone array and wherein the position of the speaker is determined by comparing delays in the received audio at each of a plurality of microphones of the microphone array.

14. The apparatus of claim 11, wherein the audio from the speaker is a spoken command, the processor further applying speech recognition to the received spoken command to determine the spoken command and executing the determined spoken command.

15. The apparatus of claim 11, further comprising a memory to store a lookup table of different speaker positions and wherein the processor applies the determined position to the look-up table to obtain the selected pre-determined audio filter.

16. The apparatus of claim 15, wherein the lookup table is populated by using a plurality of transfer functions for each determined position and by applying each of the transfer functions to a known stored audio reference signal.

17. The apparatus of claim 11, wherein the determined position is compared to a plurality of overlapping isolation volumes, each isolation volume corresponding to a range of possible sneaker positions, and wherein selecting a pre-determined filter comprises selecting a filter corresponding to one of the plurality of overlapping isolation volumes.

18. A computing system comprising:
 a plurality of cameras to observe a person that is an audio source as a speaker and determine a position of the speaker;
 a plurality of microphones to receive audio from the speaker and from other simultaneous audio sources, the received audio from the speaker comprising a spoken command;
 a processor to select a pre-determined audio filter from a plurality of pre-determined audio filters based on the determined position of the speaker, each of the plurality of pre-determined audio filters being configured for a possible speaker position; and
 a signal processor to apply the selected pre-determined audio filter to the received audio to separate the received audio from the speaker from the audio from the other simultaneous audio sources,
 the processor to apply speech recognition to the received spoken command of the filtered audio to determine the spoken command and to execute the determined spoken command.

19. The system of claim 18, further comprising a display coupled to the processor to display information in response to executing the command.

20. The system of claim 18, wherein the selected pre-determined audio filter is a finite impulse response filter and the signal processor applies blind source separation to separate the received audio.

* * * * *